United States Patent
Mabee

(10) Patent No.: US 10,391,597 B2
(45) Date of Patent: Aug. 27, 2019

(54) LASER WORKSTATION WITH ENDLESS LOOP CONVEYOR AND COORDINATED ACCESS DOORS

(71) Applicant: Lincoln Global, Inc., City of Industry, CA (US)

(72) Inventor: Brian Mabee, Shelby Township, MI (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 839 days.

(21) Appl. No.: 14/666,516

(22) Filed: Mar. 24, 2015

(65) Prior Publication Data

US 2015/0273641 A1   Oct. 1, 2015

Related U.S. Application Data

(60) Provisional application No. 61/972,761, filed on Mar. 31, 2014.

(51) Int. Cl.
*B23Q 7/03*       (2006.01)
*B23K 26/12*     (2014.01)
(Continued)

(52) U.S. Cl.
CPC .......... *B23Q 7/035* (2013.01); *B23K 26/0838* (2013.01); *B23K 26/127* (2013.01); *B23K 26/706* (2015.10)

(58) Field of Classification Search
CPC .. B23Q 7/035; B23K 26/706; B23K 26/0838; B23K 26/0861; B23K 26/12;
(Continued)

(56) References Cited

U.S. PATENT DOCUMENTS 3,604,689 A * 9/1971 Hutcheson .......... B01F 11/0065
                                                                    366/109
4,205,216 A * 5/1980 Douglas ................. B23K 26/02
                                                                    198/950
(Continued)

FOREIGN PATENT DOCUMENTS

CN    203109398 Y    9/2009
CN    101779757 A    7/2010
(Continued)

OTHER PUBLICATIONS

Nelson, "Laser Cutting: Flying with Lasers", published on Feb. 24, 2011, http://www.canadianmetalworking.com/product-news/laser-cutting-flying-with-lasers-24127.html, accessed on Dec. 18, 2014.
(Continued)

*Primary Examiner* — Tu B Hoang
*Assistant Examiner* — Masahiko Muranami
(74) *Attorney, Agent, or Firm* — Brad C. Spencer

(57) ABSTRACT

A laser processing unit includes a workpiece loading station, and a laser workstation having a laser robot that performs a laser operation. A flexible endless loop extends from the loading station through the workstation for delivering a workpiece from the loading station to the workstation. A first stationary wall section separates the workstation from the loading station. A second stationary wall section is offset from the first stationary wall section. A first movable door is configured to form a laser light-tight seal with the first stationary wall section. A second movable door configured to form a laser light-tight seal with the second stationary wall section. A seal projection is attached to the flexible endless loop. The seal projection forms a laser light-tight seal with the first movable door when the workpiece is located in the loading station and forms a laser light-tight
(Continued)

seal with the second movable door when the workpiece is located in the workstation.

11 Claims, 11 Drawing Sheets

(51) Int. Cl.
*B23K 26/08* (2014.01)
*B23K 26/70* (2014.01)

(58) Field of Classification Search
CPC .... B23K 26/127; B25J 21/00; G05B 19/4182; G05B 2219/45041; Y02P 90/083; B65G 15/28; B65G 15/30; B65G 15/42; B65G 17/00
USPC ............. 219/121.86, 121.6, 121.63, 121.82, 219/121.64, 121.62, 121.67, 121.7, 219/121.76, 121.77, 121.78, 121.79, 219/121.83, 121.85, 85.12, 121.69, 219/121.71, 121.72, 121.74, 121.8, 158, 219/76.14; 198/576, 582, 590, 595, 600; 700/166
See application file for complete search history.

(56) References Cited

U.S. PATENT DOCUMENTS

| | | | | |
|---|---|---|---|---|
| 4,951,419 A | * | 8/1990 | Weber | B23Q 3/155 198/346.2 |
| 5,392,900 A | * | 2/1995 | Sandwall | B63B 27/22 114/73 |
| 5,591,361 A | * | 1/1997 | Hostler | B23K 26/0823 219/121.6 |
| 5,643,477 A | | 7/1997 | Gullo | |
| 6,604,342 B1 | * | 8/2003 | Appelbaum | B29C 65/1406 156/272.2 |
| 8,084,714 B2 | | 12/2011 | Brauchle | |
| 2002/0002418 A1 | * | 1/2002 | Pratt | B23K 26/0861 700/166 |
| 2002/0134773 A1 | * | 9/2002 | Pratt | B23K 26/12 219/121.86 |
| 2003/0057191 A1 | * | 3/2003 | Wright | B23K 26/0838 219/121.63 |

FOREIGN PATENT DOCUMENTS

| | | |
|---|---|---|
| CN | 102218611 A | 10/2011 |
| CN | 202622181 U | 12/2012 |
| CN | 102896391 A | 1/2013 |
| CN | 103157922 A | 6/2013 |
| CN | 203471145 U | 3/2014 |
| EP | 0 464 455 A2 | 1/1992 |
| EP | 0900623 A1 | 3/1999 |
| JP | 2003-340589 A | 12/2003 |
| JP | 5817713 B2 | 11/2015 |
| WO | 2005/000714 A1 | 1/2005 |

OTHER PUBLICATIONS

Miller, "Keeping Pace with Production: Automating Your Solid-State Laser", published on Mar. 4, 2014, http://www.fabricatingandmetalworking.com/2014/03/keeping-pace-with-production-automating-your-solid-state-laser/, accessed on Dec. 18, 2014.

"Marking Lasers with Conveyor Belts", http://www.trotec-marking.com/en-AU/Lasermachines/custom-built-machines/Pages/conveyor-belt-machines.aspx, accessed on Dec. 18, 2014.

International Search Report for PCT/IB2015/000412 dated Aug. 20, 2015.

* cited by examiner

LASER WORKSTATION WITH ENDLESS LOOP CONVEYOR AND COORDINATED ACCESS DOORS

CROSS-REFERENCE TO RELATED APPLICATIONS

Benefit of U.S. Provisional Patent Application Ser. No. 61/972,761 filed Mar. 31, 2014, is hereby claimed and the disclosure incorporated herein by reference.

BACKGROUND OF THE INVENTION

Field of the Invention

Embodiments of the present invention relate generally to laser processing units or workstations having laser enclosures with movable doors and workpiece handling systems for transferring workpieces into and out of the laser enclosures.

Description of Related Art

Laser processing can include but is not limited to, cutting, welding, heat treating, material removal and material deposition of various ferrous and non-ferrous materials, substrates, coatings and additive substances. In manufacturing and other environments where it is necessary to optimize cycle time for piece part production, the ability to move parts into and out of a work cell is important to the success of the part manufacturer.

Typical designs and methods for creating access to the inside of a class 1 laser enclosure are through the use of moving doors. Doors open and close, which allow persons, transfer tables or shuttles to move material into and out of fixtures, which hold workpieces for laser processing. Door movement and material transfer have conventionally been independent sequential operations, i.e., the workpiece cannot be moved into or out of the enclosure until the door opens, and the laser cannot begin processing until the door is closed and safety switch contacts are made. Coordination between operation of the doors and movement of the workpieces into the laser enclosure has been minimal, and such conventional systems do not allow for a linear flow of workpieces through the laser processing unit.

What is needed is a material handling system and method in which operation of such doors is synchronized with movement of a workpiece conveyor, in order to minimize lost laser operation time during operation of the doors. Preferably, such a system would allow for a substantially linear flow of workpieces through the laser processing unit, such that it could be made part of an assembly line.

BRIEF SUMMARY OF THE INVENTION

The following summary presents a simplified summary in order to provide a basic understanding of some aspects of the devices, systems and methods discussed herein. This summary is not an extensive overview of the devices, systems and methods discussed herein. It is not intended to identify critical elements or to delineate the scope of such devices, systems and methods. Its sole purpose is to present some concepts in a simplified form as a prelude to the more detailed description that is presented later.

In accordance with one aspect of the present invention, provided is a laser processing unit including a workpiece loading station and a laser workstation. The laser workstation includes a laser robot operable to perform a laser operation on a workpiece. A flexible endless loop extends from the workpiece loading station through the laser workstation and is configured to deliver the workpiece from the workpiece loading station to the laser workstation. A first stationary wall section separates the laser workstation from the workpiece loading station at a proximal side of the laser workstation. A second stationary wall section is offset from the first stationary wall section at a distal side of the laser workstation opposite the proximal side. A first movable door is configured to form a laser light-tight seal with the first stationary wall section. A second movable door configured to form a laser light-tight seal with the second stationary wall section. A seal projection is attached to the flexible endless loop for concurrent movement with the workpiece. The seal projection forms a laser light-tight seal with the first movable door when the workpiece is located in the workpiece loading station and forms a laser light-tight seal with the second movable door when the workpiece is located in the laser workstation.

In accordance with another aspect of the present invention, provided is a laser processing unit including a workpiece loading station, a workpiece unloading station, and a laser workstation located between the workpiece loading station and the workpiece unloading station. The laser workstation includes a laser robot operable to perform a laser operation on a workpiece. A flexible endless loop extends from the workpiece loading station through the laser workstation to the workpiece unloading station. The flexible endless loop is configured to deliver the workpiece from the workpiece loading station to the laser workstation and from the laser workstation to the workpiece unloading station. A first stationary wall section separates the laser workstation from the workpiece loading station at a proximal side of the laser workstation. A second stationary wall section is offset from the first stationary wall section at a distal side of the laser workstation opposite the proximal side. A first movable door is configured to form a laser light-tight seal with the first stationary wall section. A second movable door is configured to form a laser light-tight seal with the second stationary wall section. A seal projection is attached the flexible endless loop for concurrent movement with the workpiece. The seal projection forms a laser light-tight seal with the first movable door when the workpiece is located in the workpiece loading station, and forms a laser light-tight seal with the second movable door when the workpiece is located in the laser workstation. The seal projection moves through the workpiece unloading station as the workpiece is delivered from the laser workstation to the workpiece unloading station.

In accordance with another aspect of the present invention, provided is a laser processing unit including a first workpiece transfer station, a second workpiece transfer station, and a laser workstation located between the first workpiece transfer station and the second workpiece transfer station. The laser workstation includes a laser robot operable to perform a laser operation on a first workpiece. A first stationary wall section separates the laser workstation from the first workpiece transfer station. A second stationary wall section is offset from the first stationary wall section and separates the laser workstation from the second workpiece transfer station. A first movable door is configured to form a laser light-tight seal with the first stationary wall section. A second movable door configured to form a laser light-tight seal with the second stationary wall section. A flexible endless loop extends from the first workpiece transfer station through the laser workstation to the second workpiece transfer station. The flexible endless loop is configured for reciprocating movement such that during a first workpiece transfer operation performed by the laser processing unit, the flexible endless loop moves in a first direction to deliver the first workpiece from the first workpiece transfer station to the laser workstation and to deliver a second workpiece from the laser workstation to the second workpiece transfer station. During a second workpiece transfer operation performed by the laser processing unit, the flexible endless loop moves in a second direction opposite the first direction to return the first workpiece from the laser workstation to the first workpiece transfer station and to deliver a third workpiece from the second workpiece transfer station to the laser workstation.

DETAILED DESCRIPTION OF THE INVENTION

Figure 1:
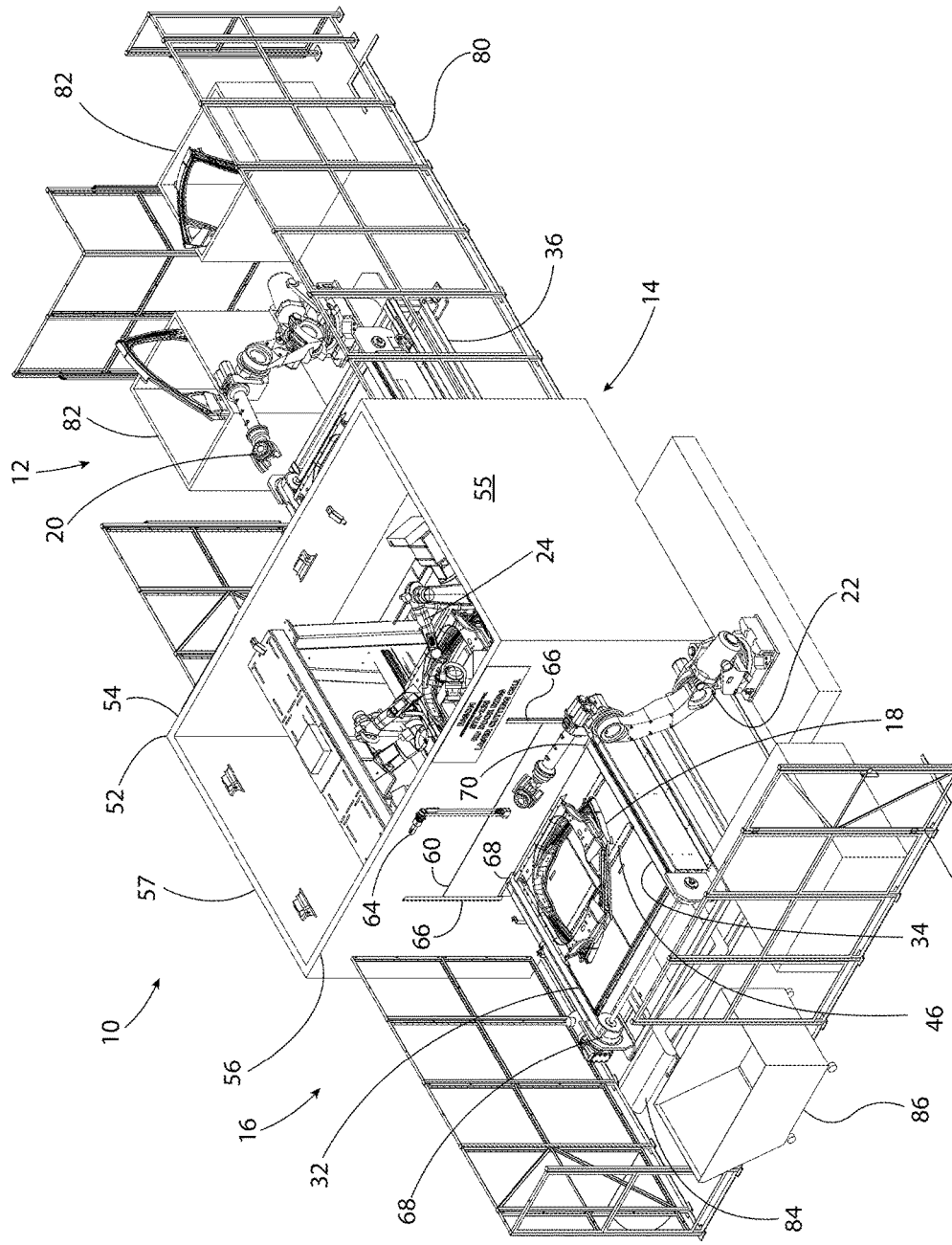
FIG. 1 is a perspective view of an example laser processing unit.

Embodiments of the present invention relate to laser processing units for performing a laser operation (e.g., cutting, welding, etc.) on a workpiece. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

Figure 2:
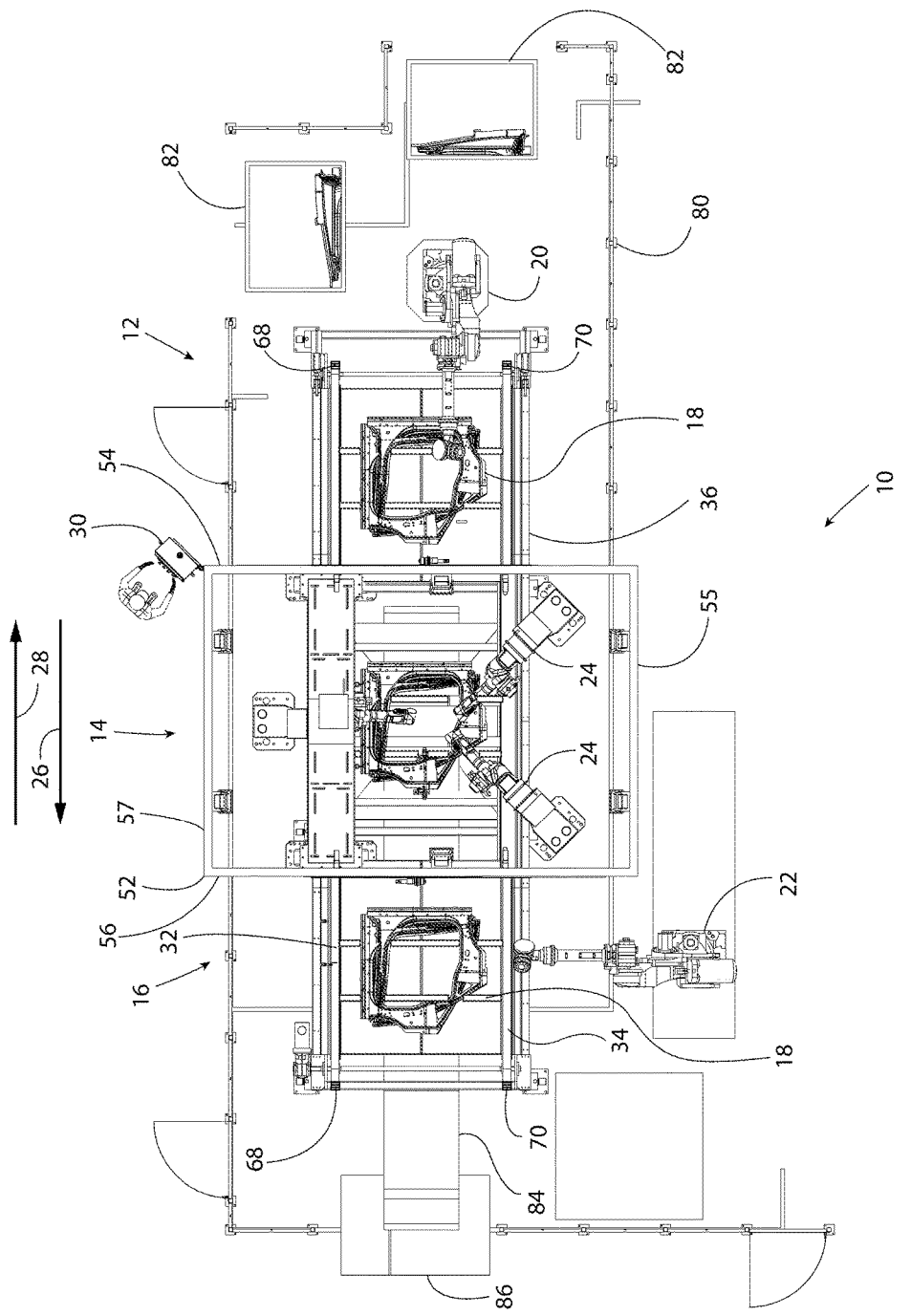
FIG. 2 is a plan view of an example laser processing unit.

FIG. 1 is a perspective view of a laser processing unit 10, and FIG. 2 is a plan view of the laser processing unit. The laser processing unit includes a first workpiece transfer station 12, a laser workstation 14, and a second workpiece transfer station 16. Workpieces 18 can be loaded onto or unloaded from the laser processing unit 10 at the transfer stations 12, 16. The transfer stations 12, 16 can include one or more transfer robots 20, 22 for loading and/or unloading workpieces from the laser processing unit 10.

The workpieces 18 are delivered from the workpiece transfer stations 12, 16 to the laser workstation 14, and from the laser workstation to the workpiece transfer stations, by the laser processing unit 10. In certain embodiments, the laser processing unit is configured to provide a linear flow of workpieces through the laser processing unit, which can allow the laser processing unit 10 to be employed in an assembly line. For example, an unprocessed first workpiece can be loaded onto the laser processing unit at the first workpiece transfer station 12. The unprocessed first workpiece is then delivered to the laser workstation 14 and subjected to laser processing, for example by a laser robot 24 operable to perform a laser operation. While the first workpiece is being processed in the laser workstation 14, a unprocessed second workpiece can be loaded onto the laser processing unit 10 at the first workpiece transfer station 12. After the first workpiece has been processed in the laser workstation 14, the first workpiece is delivered to the second workpiece transfer station 18 and, concurrently, the unprocessed second workpiece is delivered to the laser workstation. While the second workpiece is processed in the laser workstation 14, the first workpiece can be removed from the laser processing unit 10 by the transfer robot 22 at the second workpiece transfer station 18, and a third unprocessed workpiece can be placed onto the laser processing unit at the first workpiece transfer station 12. In such an embodiment, the first workpiece transfer station 12 can be considered to be a workpiece loading station, and the second workpiece transfer station 16 can be considered to be a workpiece unloading station. It can be seen that the workpieces flow through the laser processing unit 10 in a generally linear direction 26 from the first workpiece transfer station 12, through the laser workstation 14, to the second workpiece transfer station 16. Alternatively, the workpieces could flow in the opposite direction 28, from the second workpiece transfer station 16, through the laser workstation 14, to the first workpiece transfer station 12. In either scenario, the workpieces flow linearly through the laser processing unit 10, which can allow the laser processing unit to be installed in an assembly line environment. The laser processing unit 10 can be configured to selectively move workpieces in either direction, to accommodate changes in the assembly line.

Figure 8:
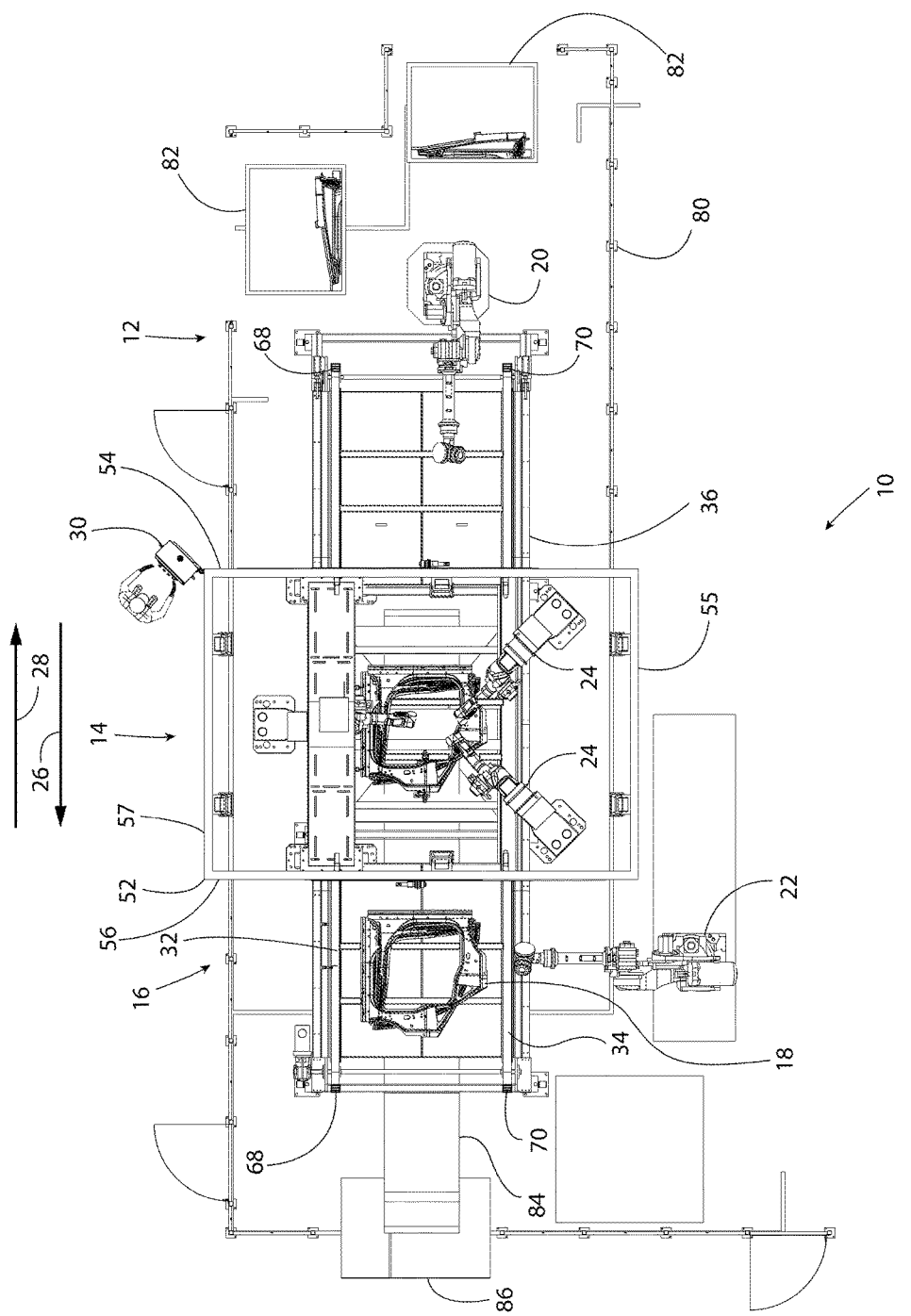
FIG. 8 is a plan view of a portion of a laser processing unit
Figure 9:
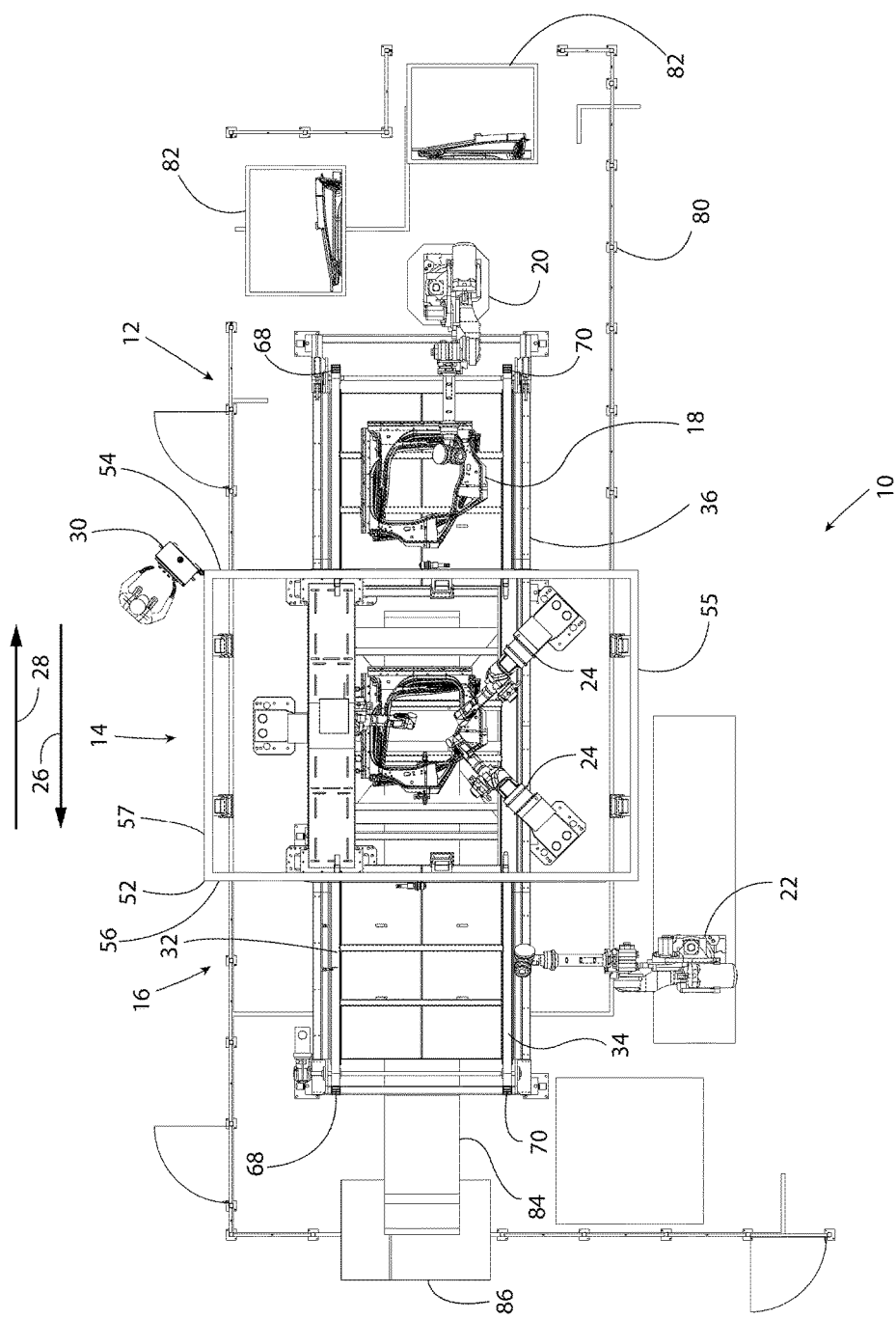
FIG. 9 is a plan view of a portion of a laser processing unit.

In certain embodiments, the laser processing unit 10 can provide for reciprocating movement of the workpieces, to allow workpieces to be loaded and unloaded at the same workpiece transfer station. For example, during a first workpiece transfer operation, an unprocessed first workpiece can be delivered to the laser workstation 14 from the first workpiece transfer station 12, and, concurrently, a processed second workpiece can be delivered from the laser workstation to the second workpiece transfer station 16. It can be seen that during the first workpiece transfer operation, workpieces are moved in a direction 26 toward the second workpiece transfer station 16. While the first workpiece is processed in the laser workstation 14, an unprocessed third workpiece is placed onto the laser processing unit 10 at the second workpiece transfer station 16 by the transfer robot 22. After one or more laser robots 24 performs a laser operation on the first workpiece, a second workpiece transfer operation is performed to move the workpieces in the opposite direction 28, toward the first workpiece transfer station 12. During the second workpiece transfer operation, the first workpiece is returned to the first workpiece transfer station 12, and the unprocessed third workpiece is delivered to the laser workstation 14. Thus, the laser processing unit 10 can operate in a reciprocating manner to move workpieces in both a first direction 26 and a second direction 28 opposite the first direction. Reciprocating movement of the workpieces is illustrated in FIGS. 8 and 9.

The laser processing unit 10 can be configured to selectively operate in either a linear or reciprocating manner, to provide increased flexibility for the end user. The laser processing unit 10 can include a control panel 30 or other user interface, which may be local or remote, for controlling the operations of the laser processing unit (e.g., start, stop, direction of movement, laser operation selection, workpiece selection, workpiece quantity, etc.)

The embodiment of FIGS. 1 and 2 show a single workpiece located at each of the workpiece transfer stations 12, 16 and the laser workstation. However, it is to be appreciated that the laser processing unit 10 can be configured to accommodate any number of workpieces at the workpiece transfer stations 12, 16 and/or the laser workstation 14. For example, the laser workstation 14 could include several substations at which respective workpieces are processed concurrently.

Structural details of the laser processing unit 10 will now be described.

The laser processing unit 10 includes at least one flexible endless loop for moving workpieces to and from the laser workstation 14. Example flexible endless loops include belts, drive chains, and the like. In the embodiments shown in the figures, the laser processing unit 10 has two flexible endless loops, or belt members 32, 34 that extend from the first workpiece transfer station 12 (or workpiece loading station), through the laser workstation 14, and to the second workpiece transfer station 16 (or workpiece unloading station). The belt members 32, 34 extend substantially parallel with each other and are located at opposite lateral sides of the laser processing unit 10.

The laser processing unit 10 includes a frame 36 that supports the belt members 32, 34 and workpieces above a factory floor. As can be seen in FIGS. 1-5, the belt members 32, 34 are mounted on pulleys 38. The pulleys 38 allow the belt members to revolve in either one direction or both directions 26, 28. The pulleys 38 are attached to the frame 36 at opposite ends of the frame. At each end of the frame 36, the pulleys 38 at that end are connected by a shaft 40 so that the pulleys operate simultaneously at the same angular velocity. Because the pulleys 38 are linked by the belt members 32, 34 and shafts 40, the belt members can be driven by a common servo motor 42 attached to the frame.

The servo motor 42 can be coupled to one of the pulleys 38 through a gearbox 44, which drives said one of the pulleys. The servo motor can be controlled to drive the belt members 32, 34 in either direction 26, 28. If desired, the laser processing unit 10 can include a variable frequency drive (VFD) for supplying power to the servo motor 42 so that the belt members 32, 34 can be driven at variable speeds.

In certain embodiments, the pulleys 38 can include gear teeth that engage corresponding notches on the inner side of the belt members 32, 34, to help drive the belt members without slipping.

Figure 5:
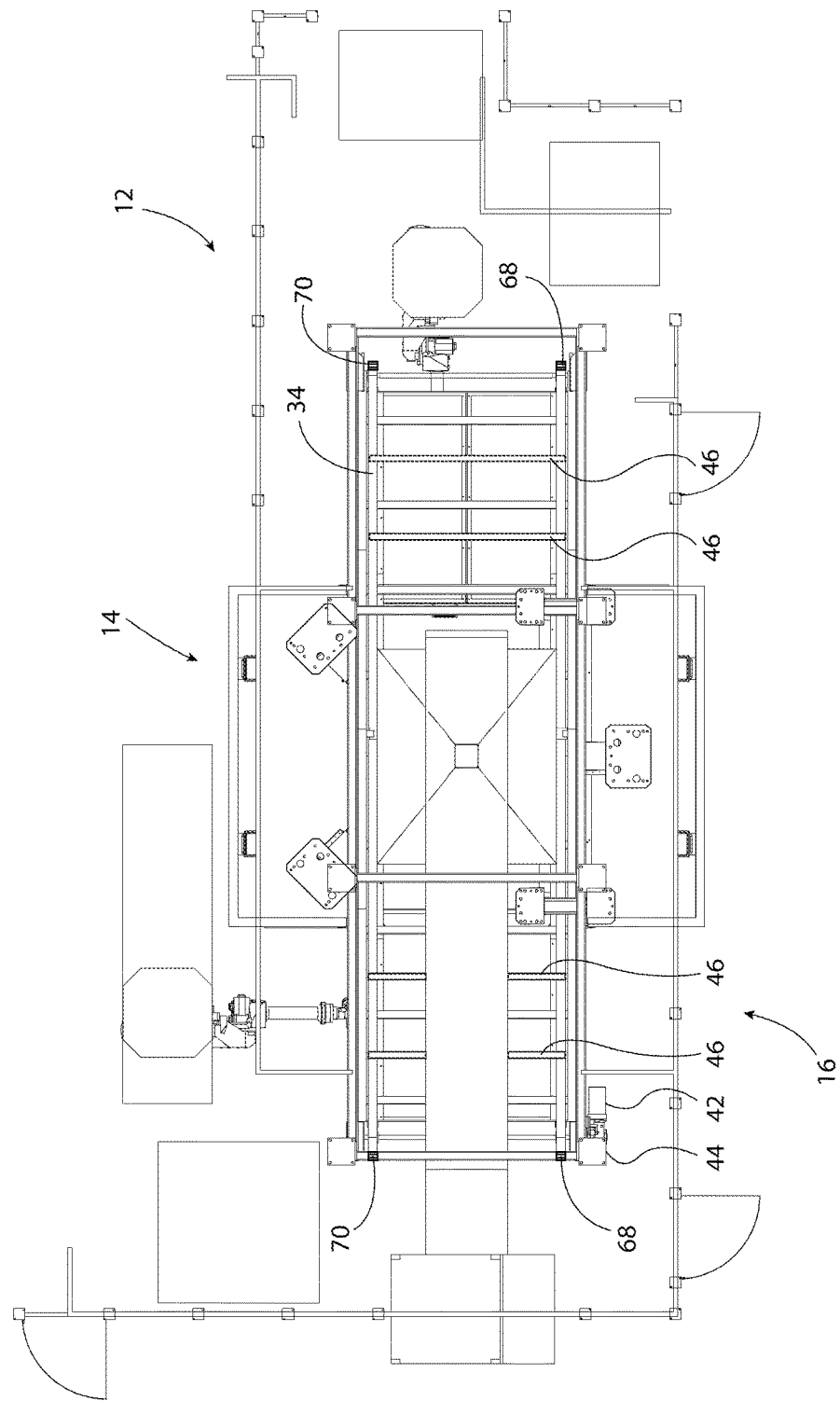
FIG. 5 is a plan view of an example laser processing unit.

The belt members 32, 34 have active upper belt portions that are or can be presently used to transport workpieces. As best seen in FIG. 5, the belt members 32, 34 also have lower belt portions that are presently inactive. The inactive lower belt portions move in an opposite direction from the active upper belt portions and can be recirculated to the upper portion of the belt, as the belt members 32, 34 revolve. The inactive lower belt portions can be recirculated to become active upper belt portions. However, if the laser processing unit 10 operates in a reciprocating manner, the inactive lower belt portions will not be recirculated, but will reciprocate along the underside of the laser processing unit 10.

Figure 6:
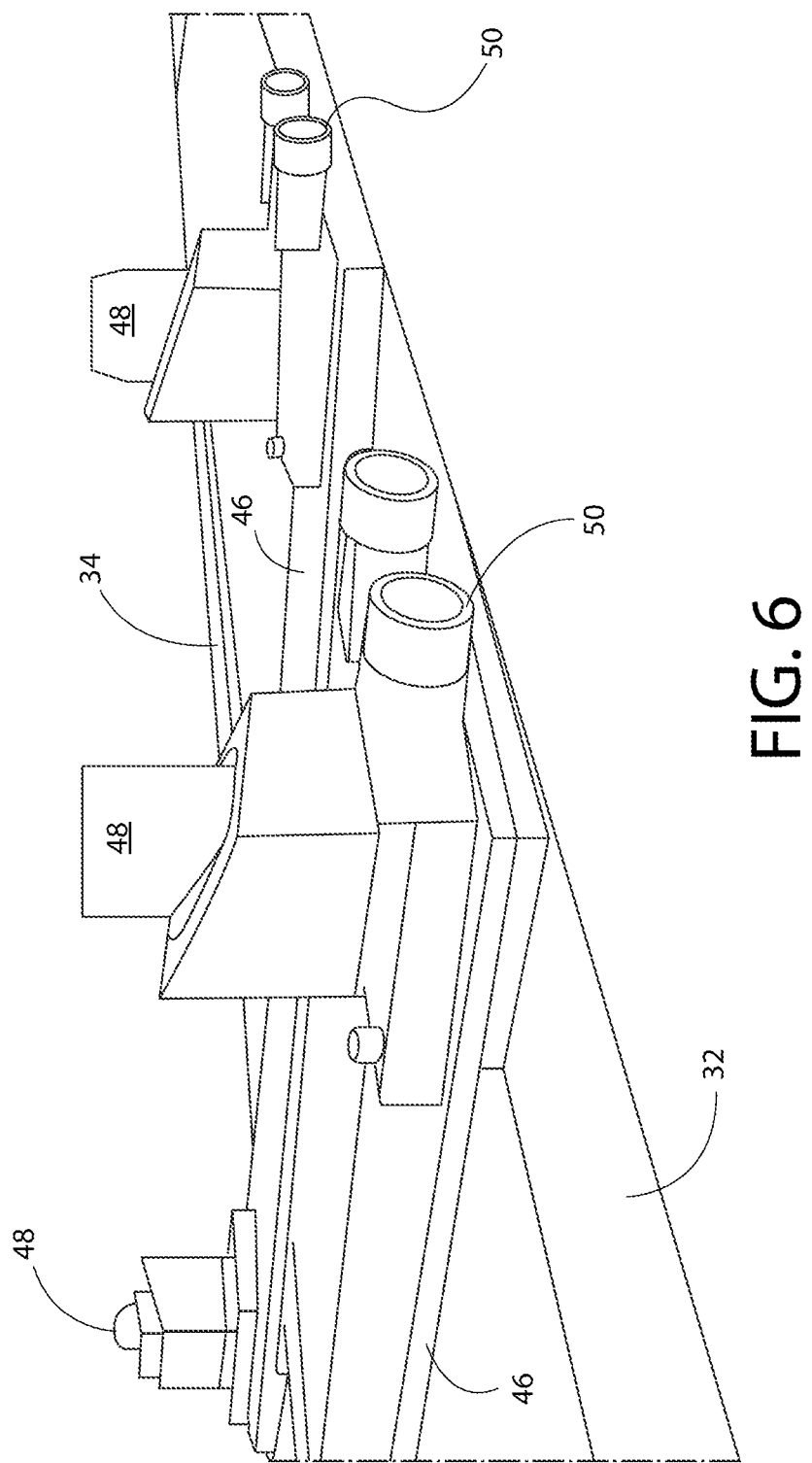
FIG. 6 is a perspective view of a portion of a laser processing unit.

Extending between the belt members 32, 34 are crossmembers 46. The crossmembers 46 are attached to the belt members 32, 34 and are moved by the belt members 32, 34. The crossmembers 46 support the workpieces during operation of the laser processing unit 10. As shown in FIG. 6, the crossmembers 46 can have one or more workpiece supports 48 for supporting a workpiece. Crossmembers 46 and workpiece supports 48 can together form a shuttle for transporting a workpiece through the laser processing unit 10. The workpiece supports 48 are tooling that can be customized to support a corresponding type of workpiece. For example, the workpiece supports 48 can be arranged in a first configuration to engage recesses or other structural elements of the workpiece. If another type of workpiece (e.g., having a different shape) is to be processed in the laser processing unit 10, the arrangement of the workpiece supports 48 can be changed, or the workpiece supports replaced, to accommodate the differently-shaped workpiece. The workpiece supports 48 would not typically have clamping members that hold the workpiece in place. Rather, the workpiece would merely rest on the workpiece supports 48 as it is moved along the laser processing unit 10.

As the belt members 32, 34 revolve during operation of the laser processing unit 10, the workpiece supports 48 travel from an upwardly-facing position to a downwardly-facing position, and can be recirculated along the underside of the laser processing unit 10 (e.g., returned to the first workpiece transfer station 12). In certain embodiments, the workpiece supports 48 can include one or more rollers 50 that engage a roller track (not shown) to support the weight of the workpiece support as it travels along the underside of the laser processing unit 10.

If the laser processing unit 10 is configured for reciprocating operation as discussed above, the active upper belt portion and upper crossmembers can have a plurality of upwardly-facing workpiece supports 48 having a configuration corresponding to the shape of one type of workpiece, and the inactive lower belt portion and lower crossmembers can have a plurality of downwardly-facing workpiece supports having a different configuration corresponding to the shape of a different type of workpiece. Examples of different types of workpieces are car doors and car hoods, and the upwardly-facing workpiece supports can be configured (e.g., arranged) to carry car doors, and the downwardly-facing workpiece supports can be configured differently to carry car hoods. When it is desired to process car hoods in the laser workstation 14, the downwardly-facing workpiece supports can be moved into the upwardly-facing position. The active, upwardly-facing workpiece supports 48 can include two substantially identical sets of workpiece supports, or two substantially identical shuttles, for moving the car doors within the laser processing unit 10. Similarly, the inactive, downwardly-facing workpiece supports 48 can include two substantially identical sets of workpiece supports, or two substantially identical shuttles, for moving the car hoods within the laser processing unit 10 when in the active position. In a first reciprocating operation to process the car doors, an unprocessed first car door can be delivered to the laser workstation 14 from the first workpiece transfer station 12 by a first shuttle, and a processed second car door can be delivered to the second workpiece transfer station 16 from the laser workstation 14 by a second, identical shuttle. While the first car door is processed in the laser workstation 14, the processed second car door can be removed from the second shuttle and replaced with an unprocessed third car door. When processing of the first car door in the laser workstation 14 is complete, the processed first car door can be delivered to the first workpiece transfer station 12 by the first shuttle, and the unprocessed third car door can be delivered from the second workpiece transfer station 15 to the laser workstation 14 by the second shuttle. Thus, the belt members 32, 34, crossmembers 46 and workpiece supports can operate in a reciprocating manner, moving back and forth in opposite directions 26, 28 to transfer workpieces within the laser processing unit 10. Simultaneously, the inactive, downwardly-facing workpiece supports will experience similar reciprocating movement along the underside of the belt members 32, 34. When it is desired to process car hoods, the downwardly-facing workpiece supports can be moved into the upwardly-facing position and operated similarly to the car door workpiece supports (which will now be facing downward).

It is to be appreciated that the laser processing unit 10 can be operated to provide a linear flow of workpieces through the laser processing unit, or in a reciprocating manner. If operated in a reciprocating manner, the laser processing unit 10 can be configured to accommodate workpieces having different shapes, as discussed above. If operated to provide a linear flow of workpieces, all of the workpiece supports or shuttles would typically have a substantially similar configuration, to accommodate one type of workpiece at a time.

Referring to FIGS. 1-4, the laser workstation 14 is surrounded by an enclosure 52. The enclosure 52 can include a first stationary wall section 54 (e.g., at a proximal side of the laser workstation 14), a second stationary wall section 56 offset from the first stationary wall section (e.g., at a distal side of the laser workstation opposite the proximal side), and opposed side wall portions 55, 57 extending between the first stationary wall section and the second stationary wall section. The enclosure 52 can also include a roof (not shown). The primary purpose of the enclosure 52 is to provide an environment that is laser light-tight and eye safe during laser processing (e.g., according to ANSI Standard Z136.X.)

The first and second stationary wall sections 54, 56 include openings through which workpieces are transferred into and out of the laser workstation 14. The belt members 32, 34 also pass through the openings in the stationary wall sections 54, 56. The laser processing unit 10 further includes movable doors 58, 60 for respectively closing the openings in the stationary wall sections 54, 56. During a workpiece transfer operation, the doors 58, 60 are in an open position to allow workpieces to pass through the first and second stationary wall sections 54, 56. However, during laser processing, the doors 58, 60 are in a closed position to prevent laser light from escaping the enclosure 52.

Figure 7:
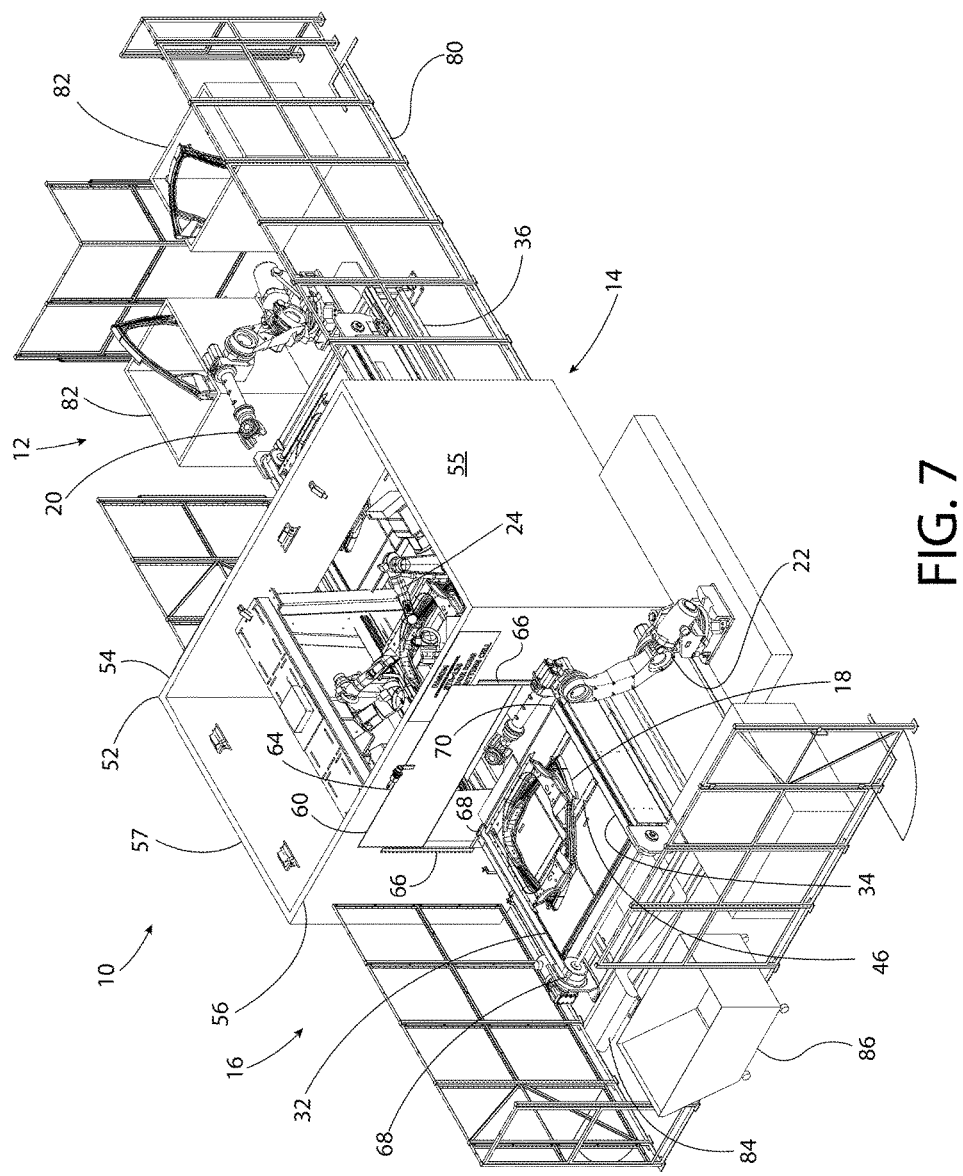
FIG. 7 is a perspective view of a portion of a laser processing unit.

The doors 58, 60 are shown in the figures as being configured for vertical movement. However, the doors 58, 60 could be configured for movement in other directions, such as horizontally for example. The doors 58, 60 are shown in the closed position in FIG. 1 and in the open position in FIG. 7.

Figure 3:
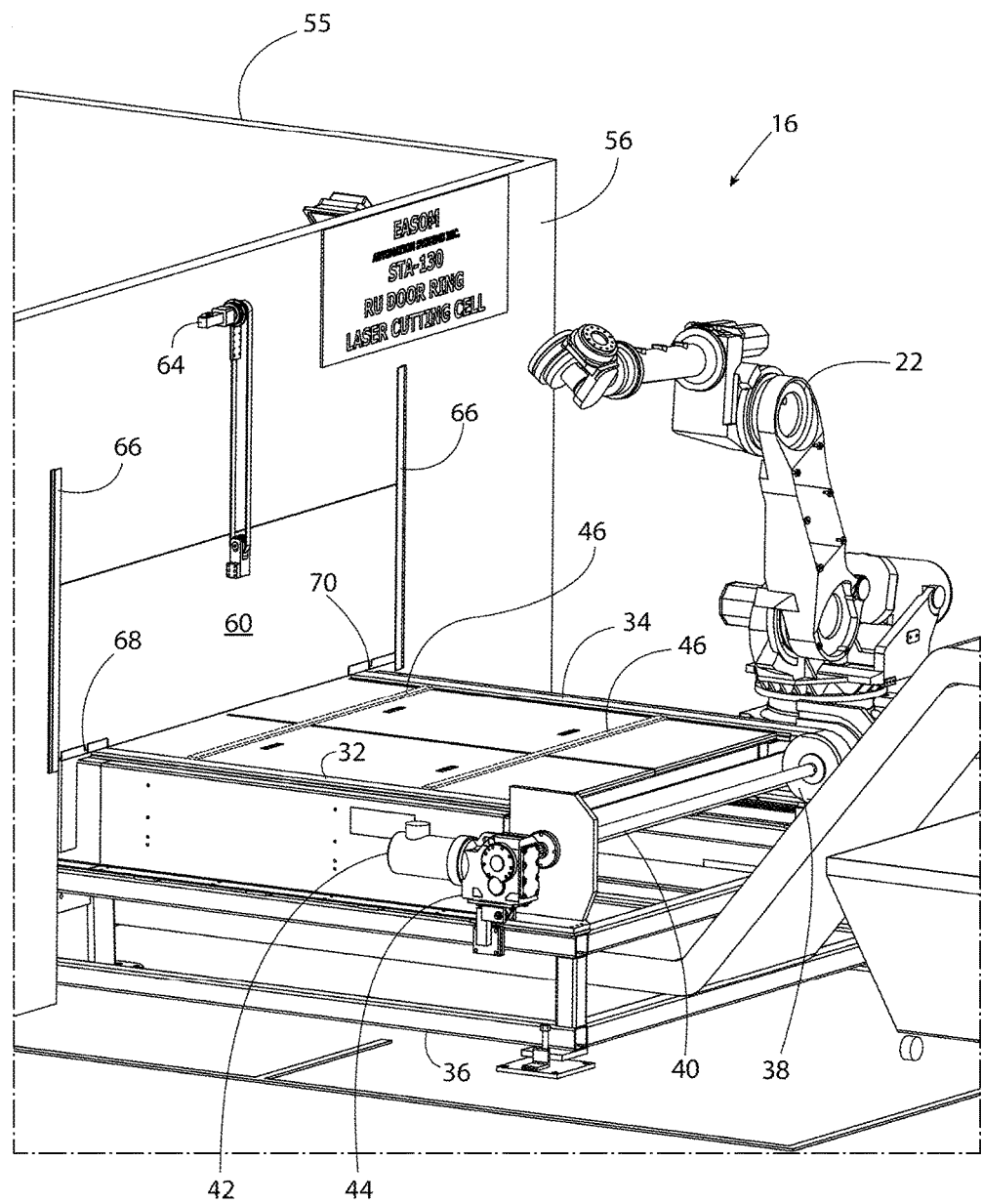
FIG. 3 is a perspective view of a portion of a laser processing unit.
Figure 4:
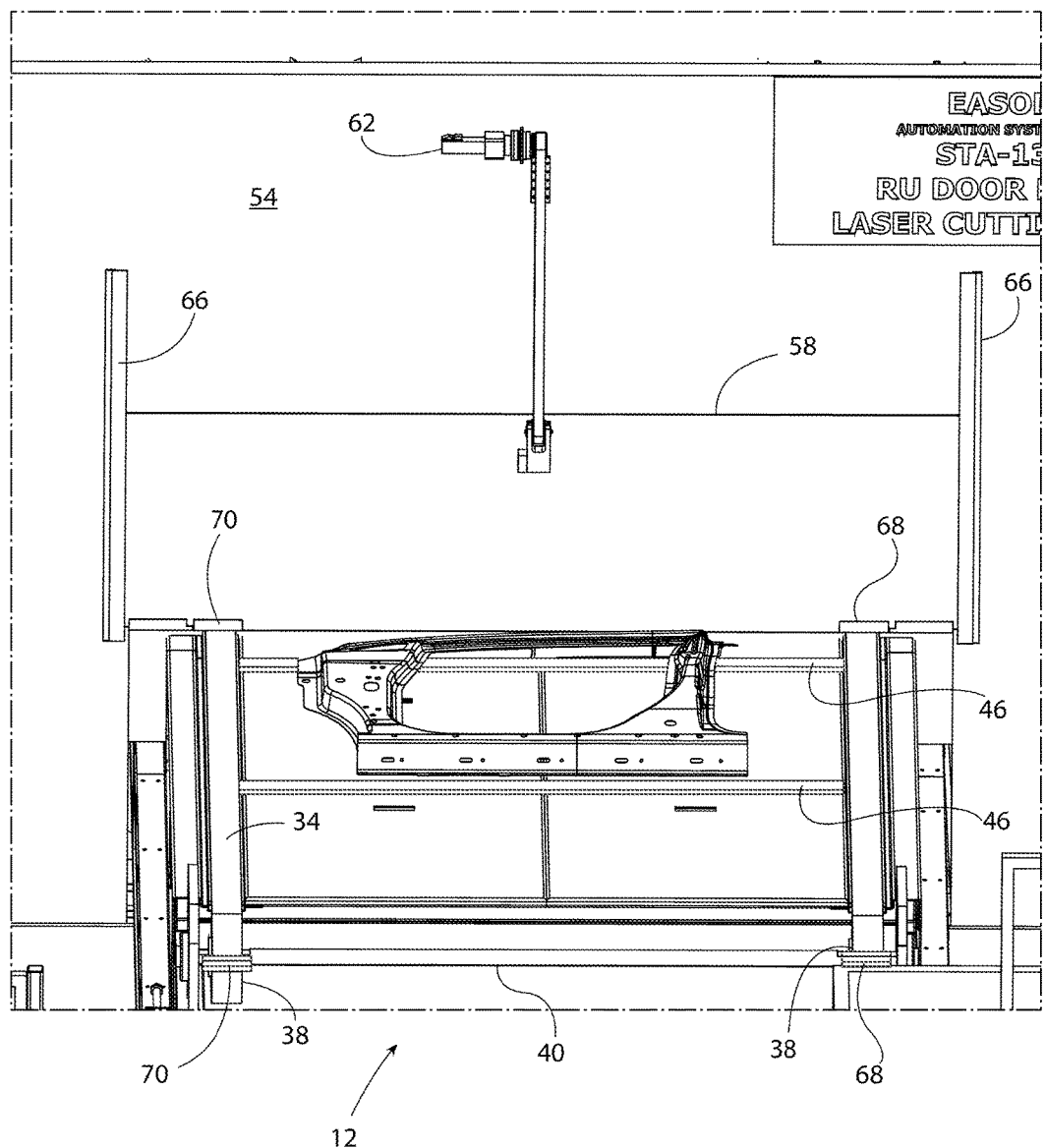
FIG. 4 is a perspective view of a portion of a laser processing unit.

As best seen in FIGS. 3 and 4, the movable doors 58, 60 can be opened and closed by motorized door operators 62, 64. Operations of the motorized door operators 62, 64, and operations of the servo motor 42 for driving the belt members 32, 34, can be controlled by a processor-based controller, as discussed below. The motorized door operators 62, 64 could have various driving mechanisms suitable for moving the doors 54, 56. The example door operators 62, 64 shown in the figures have a belt drive. However, other door operators can include chain drives, screw or shaft drives, pneumatic operators, hydraulic operators, etc. The door operators 62, 64 can also include counter weights or springs (not shown) to assist in moving the doors.

Figure 10:
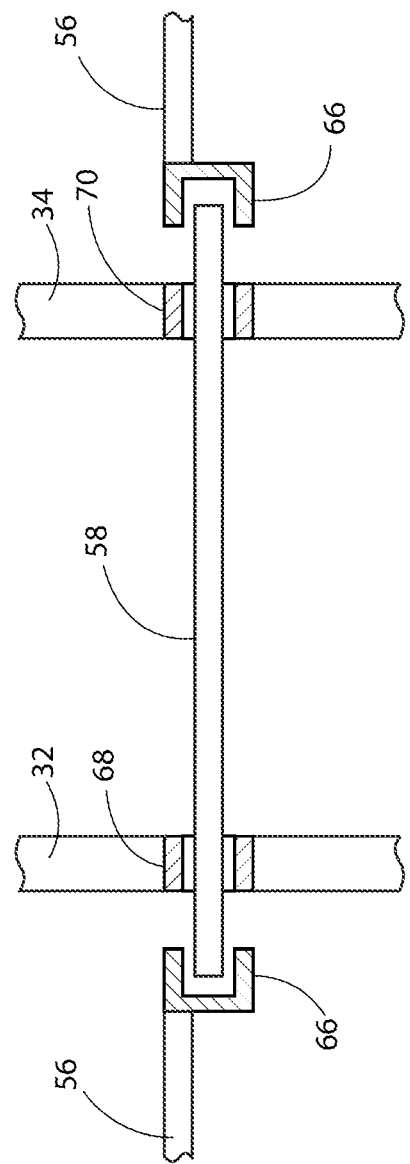
FIG. 10 is a schematic view of a portion of a laser processing unit.

Along the lateral sides of the movable doors 58, 60 are vertical seal channels 66. The doors 58, 60 move within the vertical seal channels 66, and the seal channels serve to form a laser light-tight seal around the doors when the doors are in the closed position. The primary purpose of the seal channels 66 is to prevent laser light from escaping the laser workstation 14 through the openings in the stationary wall sections 54, 56 and around the doors 58, 60 during laser processing. The seal channels 66 could also function as a track for the movable doors 58, 60. Example vertical seal channels can be "C" or "L" shaped. Example vertical seal channels 66 are shown schematically in FIG. 10.

The laser processing unit 10 can also include horizontal seal channels having a "U" shape, for forming laser-light tight seals with the lower edges of the doors 58, 60. The horizontal seal channels can include stationary channels that are aligned with portions of the doors 58, 60 that do not overlap the belt members 32, 34. The horizontal seal channels can also include small (narrow) movable seal projections 68, 70 that are attached to the belt members 32, 34, move with the belt members, and can receive the lower edges of the doors. The movable seal projections 68, 70 are shown schematically in FIG. 10 and can also be seen in FIGS. 3 and 4. When aligned, the stationary horizontal seal channels and the movable seal projections can form a substantially continuous horizontal seal channel for sealing the lower edge of a movable door. The stationary horizontal seal channels and movable seal projections 68, 70 can be formed from U-channel strut, for example.

Together, the belt members 32, 34 have numerous pairs of seal projections 68, 70 for forming laser light-tight seals with the doors 58, 60. The seal projections 68, 70 move with the belt members 32, 34 and can be recirculated as the belt members revolve, or be shifted back and forth (e.g., between the doors 58, 60) if the laser processing unit 10 is operating in a reciprocating mode. For example, each belt member 32, 34 can have six seal projections that are capable of forming a laser light-tight seal with either door 58, 60.

When placed onto the laser processing unit 10, a workpiece 18 will be generally centered between four seal projections (one adjacent seal projection in front of the workpiece on each belt member 32, 34, and one adjacent seal projection behind the workpiece on each belt member). When the workpiece is located in a workpiece transfer or loading station, the adjacent seal projections in front of the workpiece (e.g., in the direction of travel of the workpiece toward the laser workstation 14), can form laser light-tight seals with the nearest movable door. When the workpiece is moved to the laser workstation 14, the adjacent seal projections in front of the workpiece will be moved to form laser-light tight seals with the second movable door. Simultaneously, adjacent seal projections behind the workpiece will be moved up to form laser light-tight seals with the first movable door. Thus, when the workpiece is subjected to laser processing in the laser workstation 14, the four seal projections within which the workpiece is generally centered will form laser light-tight seals with both movable doors 58, 60. The seal projections 68, 70 are spaced along the belt members according to the width of the laser workstation 14, and the movement and positioning of the belt members 32, 34 is controlled, so that adjacent or neighboring seal projections will be aligned with the movable doors 58, 60 after each workpiece transfer operation. The control system for the laser processing unit 10 can include appropriate sensors or feedback devices for ensuring that movable seal projections 68, 70 are aligned with movable doors 58, 60 before closing the doors and/or performing laser processing.

If the laser processing unit 10 is operating so as to provide a linear flow of workpieces through the laser processing unit (i.e., not reciprocating), each seal projection in turn will form a laser light-tight seal with one door, and then the other, and then move through the workpiece unloading station with the workpiece, and finally be recirculated to the workpiece loading station. The active upper belt portion of the belt members 32, 34 moves the seal projections through the workpiece transfer or loading/unloading stations and through the laser workstation, whereas the inactive lower belt portion recirculates the seal projections.

If the laser processing unit 10 is operating in a reciprocating mode, to move workpieces back and forth between a transfer station and the laser workstation, three pairs of seal projections on the belt members 32, 34 can be used to form seals with the movable doors 58, 60. The three pairs of seal projections can include a center pair, a left pair and a right pair (e.g., when viewed in the plan view of FIGS. 8 and 9). In a first position of the belt members 32, 34, the center pair of seal projections will form a laser light-tight seal with the first door, and the left pair of seal projections will form a laser light-tight seal with the second door. When the belt is shifted to a second position (e.g., in the direction 26), the right pair of seal projections will form a laser light-tight seal with the first door and the center pair of seal projections will form a laser light-tight seal with the second door. The belt can be shifted from the second position back to the first position, in which the center pair of seal projections will again form the laser light-tight seal with the first door, and the left pair of seal projections will again form the laser light-tight seal with the second door.

Figure 11:
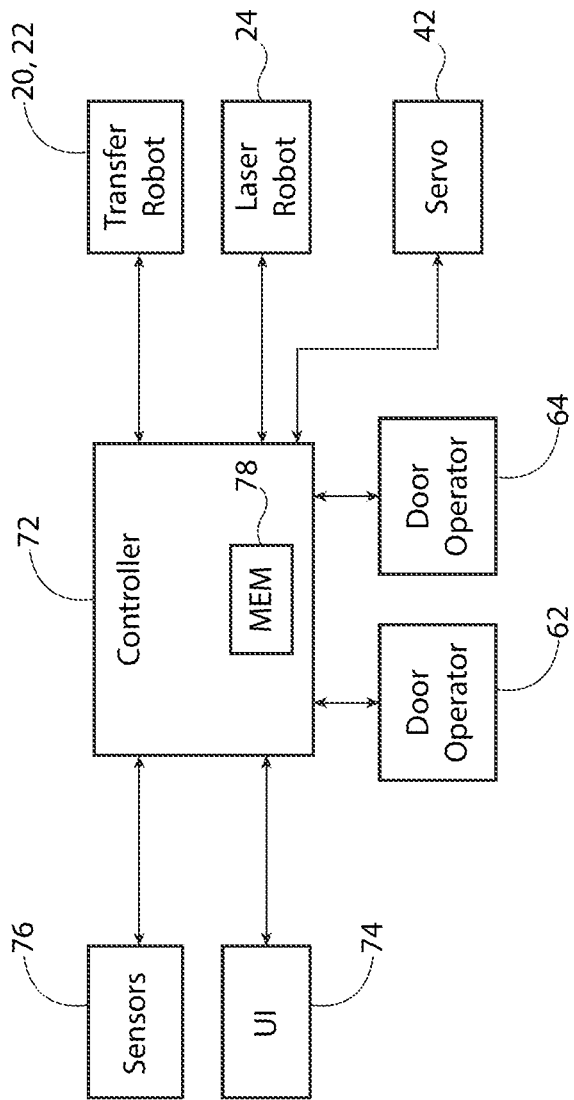
FIG. 11 is a block diagram.

FIG. 11 is an block diagram of an example control system for the laser processing unit. Controller 72 can control operations of the transfer robots 20, 22 and the laser robot 24. The controller 72 can also control operations of the servo motor 42 that drives the belt members, and the motor operators 62, 64 for the movable doors. The controller 72 receives user input (e.g., start commands, stop commands, program selection, etc.) from a user interface 74, and can monitor the state of various sensors 76 (e.g., position sensors, encoders, limit switches, etc.) The controller 72 and the user interface 74 can be part of the control panel 30 (FIG. 2) for the laser processing unit. The controller 72 can be an electronic controller and can include one or more processors. For example, the controller 72 can include one or more of a microprocessor, a microcontroller, a digital signal processor (DSP), an application specific integrated circuit (ASIC), a field-programmable gate array (FPGA), programmable logic controller (PLC) discrete logic circuitry, or the like. The controller 72 can further include memory 78 and may store program instructions that cause the controller to provide the functionality ascribed to it herein. The memory 78 may include one or more volatile, non-volatile, magnetic, optical, or electrical media, such as read-only memory (ROM), random access memory (RAM), electrically-erasable programmable ROM (EEPROM), flash memory, or the like.

As best shown in FIG. 1, the laser processing 10 unit can further include safety fencing 80 and panels to protect personnel, and workpiece bins 82 for holding processed or unprocessed workpieces. The laser processing unit 10 can further include a secondary conveyor 84 for removing cut portions and other debris from the laser workstation 14. The secondary conveyor 84 can be configured to transport the cut portions and other debris to a receptacle 86 for final disposal.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A laser processing unit, comprising:
a workpiece loading station;
a workpiece unloading station;
a laser workstation including a laser robot operable to perform a laser operation on a workpiece;
wherein the laser workstation is located between the workpiece loading station and the workpiece unloading station;
a flexible endless loop extending from the workpiece loading station through the laser workstation and configured to deliver the workpiece from the workpiece loading station to the laser workstation;
a first stationary wall section separating the laser workstation from the workpiece loading station at a proximal side of the laser workstation;
a second stationary wall section offset from the first stationary wall section at a distal side of the laser workstation opposite the proximal side;
a first movable door mounted on the first stationary wall section and movable between an open position and a closed position, and configured to form a laser light-tight seal with the first stationary wall section;
a second movable door mounted on the second stationary wall section and movable between an open position and a closed position, and configured to form a laser light-tight seal with the second stationary wall section; and
a seal projection attached to the flexible endless loop for concurrent movement with the workpiece, wherein the seal projection forms a laser light-tight seal with the first movable door when the workpiece is located in the workpiece loading station and the first movable door is in its closed position, and forms a laser light-tight seal with the second movable door when the workpiece is located in the laser workstation and the second movable door is in its closed position, and wherein the seal projection is configured as an upwardly-facing channel for receiving a lower edge of the first movable door within said channel and subsequently receiving a lower edge of the second movable door within said channel wherein the flexible endless loop comprises a driven belt having an upper belt portion and a lower belt portion and the belt revolves during operation of the laser processing unit,
the laser processing unit further comprising a plurality of further seal projections attached to the belt for concurrent movement with the workpiece, and
during a revolution of the belt, each of the seal projections is moved by the upper belt portion to form respective laser light-tight seals with the first movable door and subsequently with the second movable door, and is recirculated by the lower belt portion.

2. The laser processing unit of claim 1, wherein the flexible endless loop comprises a driven belt having a plurality of workpiece supports for supporting the workpiece.

3. The laser processing unit of claim 2, wherein the driven belt is a first driven belt, and the laser processing unit further comprises a second driven belt and a plurality of crossmembers extending between the first driven belt and the second driven belt for concurrent movement with the workpiece, wherein the plurality of workpiece supports are mounted to the crossmembers.

4. The laser processing unit of claim 1, wherein the flexible endless loop comprises a driven belt having an active upper belt portion and an inactive lower belt portion, and the active upper belt portion includes a plurality of upwardly-facing workpiece supports for supporting the workpiece, and the inactive lower belt portion includes a plurality of downwardly-facing workpiece supports, wherein the upwardly-facing workpiece supports have a first configuration, and the downwardly-facing workpiece supports have a second configuration, different from the first configuration, for supporting a differently-shaped workpiece when moved to an upwardly-facing active position.

5. The laser processing unit of claim 1, wherein the flexible endless loop is configured for reciprocating movement such that:
during a first workpiece transfer operation performed by the laser processing unit, the flexible endless loop moves in a first direction to deliver the workpiece from the workpiece loading station to the laser workstation, and
during a second workpiece transfer operation performed by the laser processing unit, the flexible endless loop moves in a second direction opposite the first direction to return the workpiece from the laser workstation to the workpiece loading station.

6. The laser processing unit of claim 5, wherein the flexible endless loop comprises a driven belt having an active upper belt portion and an inactive lower belt portion, and the active upper belt portion includes a plurality of upwardly-facing workpiece supports for supporting the workpiece, and the inactive lower belt portion includes a plurality of downwardly-facing workpiece supports, wherein the upwardly-facing workpiece supports have a first configuration, and the downwardly-facing workpiece supports have a second configuration, different from the first configuration, for supporting a differently-shaped workpiece when moved to an upwardly-facing active position.

7. A laser processing unit, comprising:
a first workpiece transfer station;
a second workpiece transfer station;
a laser workstation located between the first workpiece transfer station and the second workpiece transfer station, and including a laser robot operable to perform a laser operation on a first workpiece;
a first stationary wall section separating the laser workstation from the first workpiece transfer station;
a second stationary wall section offset from the first stationary wall section and separating the laser workstation from the second workpiece transfer station;
a first movable door mounted on the first stationary wall section and movable between an open position and a closed position, and configured to form a laser light-tight seal with the first stationary wall section;
a second movable door mounted on the second stationary wall section and movable between an open position and a closed position, and configured to form a laser light-tight seal with the second stationary wall section;
a flexible endless loop extending from the first workpiece transfer station through the laser workstation to the second workpiece transfer station; and
a seal projection attached to the flexible endless loop for concurrent movement with the first workpiece, wherein the seal projection forms a laser light-tight seal with at least one of the first movable door and the second movable door when said at least one of the first movable door and the second movable door is in its closed position, and wherein the seal projection is configured as an upwardly-facing channel for receiving a lower edge of said one of the first movable door the second movable door within said channel;
wherein the flexible endless loop is configured for reciprocating movement such that:
during a first workpiece transfer operation performed by the laser processing unit, the flexible endless loop moves in a first direction to deliver the first workpiece from the first workpiece transfer station to the laser workstation and to deliver a second workpiece from the laser workstation to the second workpiece transfer station, and
during a second workpiece transfer operation performed by the laser processing unit, the flexible endless loop moves in a second direction opposite the first direction to return the first workpiece from the laser workstation to the first workpiece transfer station and to deliver a third workpiece from the second workpiece transfer station to the laser workstation.

8. The laser processing unit of claim 7, wherein the flexible endless loop comprises a driven belt having a plurality of workpiece supports for supporting the first workpiece and the second workpiece concurrently.

9. The laser processing unit of claim 8, wherein the driven belt is a first driven belt, and the laser processing unit further comprises a second driven belt and a plurality of crossmembers extending between the first driven belt and the second driven belt, wherein the plurality of workpiece supports are mounted to the crossmembers.

10. The laser processing unit of claim 8,
wherein the seal projection is a first seal projection attached to the driven belt for concurrent movement with the belt, and the laser processing unit further comprises:
a second seal projection attached to the driven belt for concurrent movement with the belt and offset from the first seal projection in the first direction of movement of the belt; and
a third seal projection attached to the driven belt for concurrent movement with the belt and offset from the second seal projection in the first direction of movement of the belt, wherein:
in a first position of the driven belt, the second seal projection forms a laser light-tight seal with the first movable door and the third seal projection concurrently forms a laser light-tight seal with the second movable door, and
in a second position of the driven belt, the first seal projection forms a laser light-tight seal with the first movable door and the second seal projection concurrently forms a laser light-tight seal with the second movable door.

11. The laser processing unit of claim 7, wherein:
the flexible endless loop comprises a driven belt having an active upper belt portion and an inactive lower belt portion,
the active upper belt portion includes a plurality of upwardly-facing workpiece supports configured for supporting the first workpiece, the second workpiece, and the third workpiece, and the upwardly-facing workpiece supports have a first configuration corresponding to a shape of the first workpiece, the second workpiece and the third workpiece, and the inactive lower belt portion includes a plurality of downwardly-facing workpiece supports, and the downwardly-facing workpiece supports have a second configuration, different from the first configuration, for supporting, when moved to an upwardly-facing active position, further workpieces having a different shape than the first workpiece, the second workpiece and the third workpiece.

\* \* \* \* \*